United States Patent [19]

Gagliardi et al.

[11] Patent Number: 4,696,001
[45] Date of Patent: Sep. 22, 1987

[54] RECONFIGURABLE HIGH-SPEED INTEGRATED LOCAL NETWORK

[75] Inventors: Fabrizio Gagliardi, Turin; Livio Lambarelli, Turin; Gianfranco Panarotto, Turin; Daniele Roffinella, Moncalieri; Maurizio Sposini, Valdellatorre, all of Italy

[73] Assignee: Cselt - Centro Studi e Laboratori Telecomunicazioni S.p.A., Turin, Italy

[21] Appl. No.: 817,031

[22] Filed: Jan. 8, 1986

[30] Foreign Application Priority Data

Mar. 6, 1985 [IT] Italy ............................... 67229 A/85

[51] Int. Cl.⁴ ............................................. H04J 3/14
[52] U.S. Cl. ........................................ 370/88; 370/16
[58] Field of Search .................. 370/88, 16, 89, 87, 370/1, 3, 4; 340/825.01, 825.05, 825.5

[56] References Cited

U.S. PATENT DOCUMENTS

| | | | |
|---|---|---|---|
| 4,154,983 | 5/1979 | Pedersen | 370/89 |
| 4,530,085 | 7/1985 | Hamada et al. | 370/16 |
| 4,542,496 | 9/1985 | Takeyama et al. | 370/16 |
| 4,542,502 | 9/1985 | Levinson et al. | 370/88 |
| 4,553,233 | 11/1985 | Debuysscher et al. | 370/16 |
| 4,573,044 | 2/1986 | McConachie et al. | 370/16 |

*Primary Examiner*—Douglas W. Olms
*Attorney, Agent, or Firm*—Karl F. Ross; Herbert Dubno

[57] ABSTRACT

The local network comprises a plurality of active nodes (N1 ... Nn) placed along a folded unidirectional bus (1) which presents a writing branch (1W) and a reading branch (1R). The nodes present means (RR) for network reconfiguration in the presence of a failure, through an isolation of the parts concerned by the failure, through an isolation of the parts concerned by the failure, and for regular service restoration after the repair, and means (GA) for the implementation of an ordered access protocol, which is based on the physical position of the nodes (N1 ... Nn) and allows hybrid frames to be transmitted through the bus (FIG. 1).

12 Claims, 16 Drawing Figures

RECONFIGURABLE HIGH-SPEED INTEGRATED LOCAL NETWORK

FIELD OF THE INVENTION

The present invention refers to integrated services communication networks and in particular to a reconfigurable wide-band integrated local network.

BACKGROUND OF THE INVENTION

The term "local network" denotes networks which connect users scattered over distances ranging from a few hundred metres to some ten kilometers. These networks, which generally consist of a common transmission medium connecting all users, were first designed to connect all processing resources of a firm (computer local networks); then, they were used for both data and speech transmission (local area communication networks) and today they are developing towards an integration in a unique network of all communication services of a firm (integrated services communication systems). Then, reliability and availability of this unique network are essential requirements.

Reliability aspects refer to both access protocol and network topology. In no case electric or mechanical failures should cause a general service breakdown lasting more than a few ten milliseconds.

As for the access protocol, the use is towards distributed techniques, in a network with ring or bus configuration, which assure the right operation even in the presence of failed stations.

For the topology, a ring structure presents two main reliability problems. First, information is to be suppressed at the end of its path over the ring, e.g. by the transmitting station or a centralized device.

A centralized device eases the check of the occurred information suppression and makes it possible to recover the failure situations due to misfunctioning of the transmitting or receiving station, even in the case of a failure of the station which should eliminate the information, but it has an unsatisfactory reliability. In fact, non-catastrophic failures of the centralized device could lead to the systematic introduction of errors in the packets passing in the physical medium, while serious failures compromising its operation should cause activity interruption. Then, the duplication of this device would be unavoidable, but this would be of difficult solution due to the complex functions carried out and to the fact that the presence of two devices would require a continuous dialogue between them in order to establish the active device: in fact, the two devices should be placed in different points of the network, in order to hinder that a failure in a very limited area of the building isolates both devices, thus making the duplication useless.

Furthermore, the use of token passing protocols, commonly employed in ring networks, requires handling mechanisms such as to avoid that failures and malfunctionnings bring about a systematic token loss or duplication; in fact, such events will imply the network re-initialisation with a consequent loss in information and degradation of the quality of the service offered.

A bus structure is more reliable as, being open the common transmission line, information is automatically suppressed at the line end and a specific suppression procedure is unnecessary.

Furthermore, using the bus, the station couplers can be implemented with passive components, as the explicit signal suppression is no more necessary with a consequent reliability advantage. Still further, if future developments of communications should be considered, and hence the network should be used not only for conventional speech and data services, but also for new services such as high resolution graphic services, CAD (computer aided design) or CAM (computer aided manufacturing), videoconference with moving images, remote control of production processes, high resolution diffusive video services, etc., then bus structure well fits with the handling of hybrid switching technique which allows an effective management both of communications which present continuity characteristics and/or require synchronism maintaining, and of communications which do not present these requirements, and with the use of ordered access protocols.

This performance presents also advantages from reliability viewpoint; in particular, by an ordered access protocol, a failure which hinders transmission by a station implies the non use of the access right which is automatically transferred to the next station; therefore, a failure of a station does not affect the other stations, being interpreted as a transmission giving up. Furthermore, the presence of a cyclic frame implies no error memory, i.e. a temporary disturb which affects the correct transmission of information by one or more stations in a frame does not affect the information transmitted in the next frame.

Notwithstanding this intrinsic reliability, a bus structure with ordered access and hybrid frame transmission is affected by failures which cause a line interruption between two stations or, in the case of active networks (i.e. with signal regeneration in all or at least some stations), by the failures of station transceivers. Such failures could put out of service the whole network, as generally connection paths alternative to the common transmission line do not exist between the different network points.

Theoretically, a line failure could be remedied by a line duplication. Nevertheless, an active network requires also the duplication of the devices which, in the stations with signal regeneration, give access to the network (in particular at least the devices which manage the physical protocol level): costs are then higher. Furthermore, the two lines obtained with the duplication should be installed in different ducts, otherwise the same event could interrupt both lines: in this case, the two lines may have different lengths and could cause different propagation delays and then a complication of the algorithm handling the communications. A further source of complexity is the necessity of an algorithm for the definition of the "hot" line (line actually used for data transfer) and stand-by line.

An alternative solution is the insertion of switches along the network which automatically operate in the case of a failure of the network section protected to by-pass the section failed. For example, in the case of an active network, the switches could be placed upstream and downstream a station and they could by-pass the station in the presence of failures: thus, considering the line sections near the station as secondary sections and the remaining line as main section and placing the latter in highly protected ducts so as to limit the probability of mechanical failures, also the transmission line is partially protected. The main drawbacks of this solution are that the switches require quite long command times and the sections activated by the switches can greatly change the connection length and then originate different propagation times and higher complexity of transmission-reception devices.

To solve these problems, a reconfigurable local network has been proposed, i.e. a network that in the case of a failure in the line or in one or more stations, take such a topology as to connect all or most operating stations, isolating the failed station(s) or line section(s).

Obviously, reconfiguration should be as quick as possible, so as to allow a rapid service restoration, even if with reduced performance; furthermore, the devices which handle the reconfiguration should also allow a quick normal activity resumption, once the failure was repaired.

An example of reconfigurable network is described in the article "Performance Evaluation of Reliability Improvement Techniques for Single Loop Communications Systems" by P. Zafiropulo, IEEE Transactions on Communications, vol. Com-22, No 6, June 1974.

This article describes a network with a duplicate transmission line, consisting of two rings where only one is active under regular operation conditions of the network: the stations and, at prefixed intervals, reconfiguration units are placed along the line. These units essentially consist of an input and an output port for each ring. Under regular operation, reconfiguration units connect the input and the output port of the same ring: in the case of a failure in a station or a line section, in the unit upstream and downstream the failure, a connection is established between the input port of a ring and the output port of the other ring at the same side, so as to isolate the failed section. The article describes in detail neither the structure of the reconfiguration units nor the ways and times of reconfiguration and regular service resumption.

This known structure presents some disadvantages.

The first concerns the ring structure with central controller: a failure which isolates the section comprising the controller puts out of service the whole network without remedy; hence, a section exists which can undergo catastrophic failures. Also, due to the use of a token passing protocol, the operations of network reconfiguration and recovery are more delicate because of the necessity of not loosing or not duplicating the token. Furthermore, the duplication of transmission medium and transceivers is necessary with respect to the configuration sufficient for the network unprotected against failures.

OBJECT OF THE INVENTION

These problems are solved by the network object of the invention which, using a bus structure and an ordered access protocol based on the physical position of the stations, presents neither sections with possibility of catastrophic failures nor a possible danger of token loss or duplication. Furthermore, the network protected against the failures uses the same transmission devices provided for the network unprotected.

BRIEF DESCRIPTION OF THE DRAWING

For sake of clarity, reference will be made to the annexed drawings, where.

SPECIFIC DESCRIPTION

Figure 1:
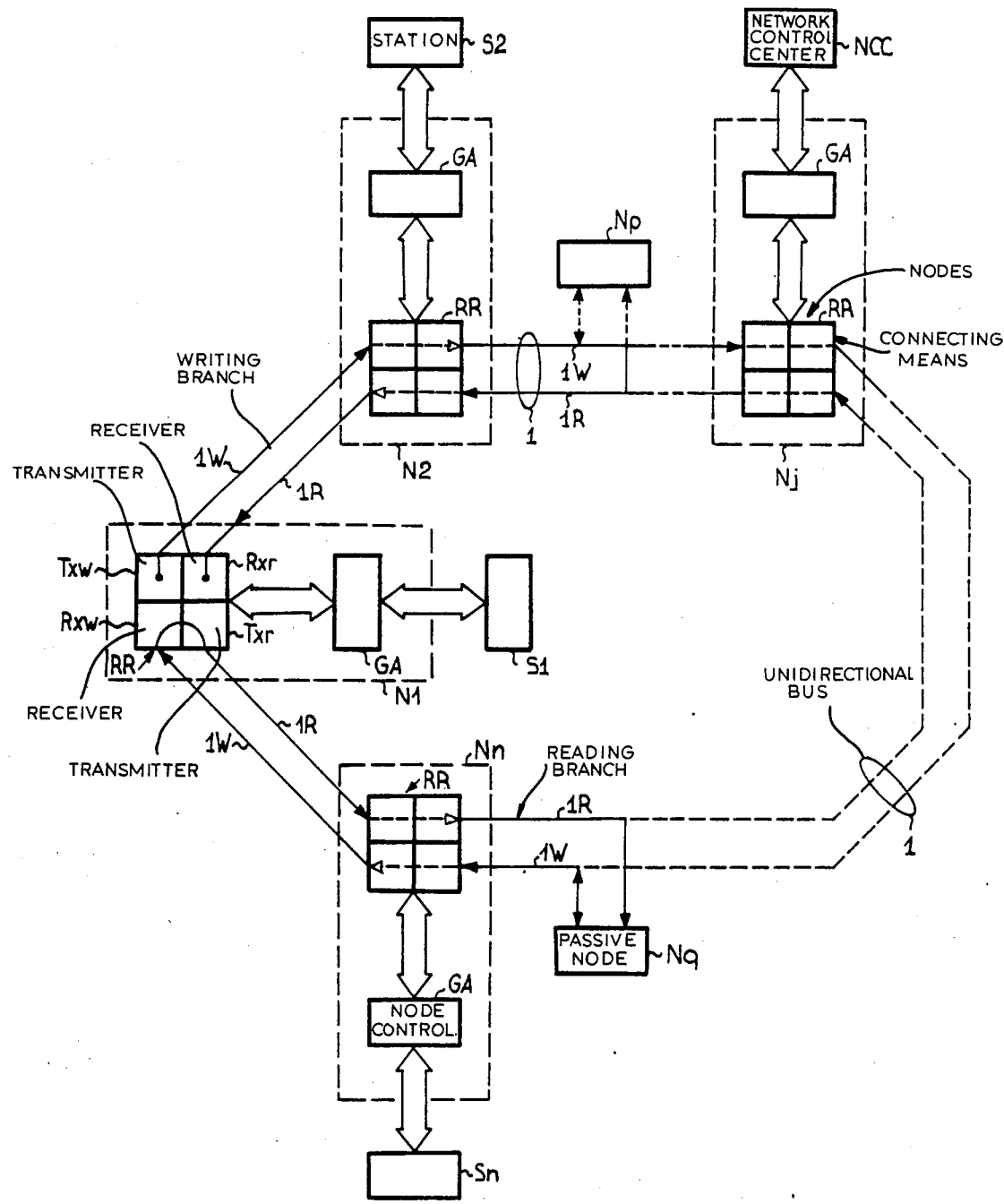
FIG. 1 is a schematic diagram of a local network according to the present invention.

FIG. 1 shows a reconfigurable local network according to the invention, consisting of a wide band unidirectional bus 1, e.g. in optical fiber, folded at one end so as to form a writing branch 1W and a reading branch 1R. Devices N1, N2 ... Nj ... Nn (hereinafter referred to as "nodes") are located along the bus. One node at least, for example Nj, is connected to a network control center NCC, which carries out functions which are suitably centralized (e.g. tariffs, storage of association maps between subscribers and nodes, etc.).

The other nodes are connected to a plurality of stations S1, S2 ... Sn corresponding to one or more terminal for the different services offered by the network.

Nodes N1 ... Nn are active nodes and here consist of two parts: the first RR comprises the devices necessary for the regeneration and synchronization of the signals transmitted via bus 1 and the reconfiguration of the network in the case of failure. The second part GA comprises the devices for distributed handling of bus access by the stations and for carrying out the functions of higher herarchical level foreseen by the standard communication protocols. GA also comprises a node controller, which generally supervises the node. The operations of GA interesting the invention will result from the following description.

The structure of blocks RR is detailed with reference to FIGS. 6 and 7; now they are only outlined by transmitters and receivers Txw, Rxw, Txr, Rxr associated with bus writing and reading branches.

Station access to the network and transmission over the bus take place as described in Italian Application No 67856-A/84 filed on Aug. 28, 1984 in the name of the Applicant. This patent application refers to a wide-band integrated services local communication system, where there are transmitted both packet-switched and circuit-switched communications, the system comprising a plurality of units associated with a plurality of stations and distributed along a unidirectional transmission line through which the information emitted by a station is rendered available to all the others and on which, in presence of the two communication types, the information of all the stations is organized into hybrid frames subdivided into two regions allotted to circuit-switched communications (circuit region) or to packet-switched communications and to signalling of circuit-switched communications (packet region), each unit comprising devices for controlling the access to the line for information transmission and reception on the basis of the existing activity, characterized in that said devices controlling the access to the line are connected to the line so as to detect at least the activity of the units placed more upstream with reference to the direction of transmission on the line and cooperate with one another and with at least one generator of frame signals, apt to send on the line at least a start-of-frame flag, so that:

in each of the two frame regions, the activity of the units with information to be transmitted is subdivided into rounds, during which each unit is ensured the access to the line for transmission of its information, each round for information transmission concerning circuit-switched communications (circuit round) coinciding with the circuit region of a frame, while the rounds for information transmission concerning packet-switched communications can be completely contained within the packet region of a frame or extend over a plurality of consecutive frames;

both in circuit rounds and in packet rounds the units accede the line, for the transmission of the information generated by the respective stations, in the order corresponding to their position along the line, beginning from the most upstream unit, referring to the transmission direction on the line;

in the circuit region, the active period of a unit has a duration varying from frame to frame according to the instantaneous requirements of the communications to which the information transmitted by the stations connected to such units refers, and such active period is shared among the stations so that they send their information according to a predetermined order, which is maintained for the whole station activity, the activity periods of contiguous units being separated by inactivity periods which depend on the position of the units with respect to the line, and are shorter than a predetermined guard time, said guard time being exceeded in case of lack of activity of a unit.

The units of that previous application essentially correspond to the nodes of the present invention.

The information must be transmitted in line with a coding allowing also the transmission of the signals necessary for protocol management (or commands)-i.e. start of frame SF, region boundary RB, start of packet round SR, delimitation of station and/or node activities, lack of activity of a station and/or node-and assuring right extraction of the clock signal from the data flow. For example, these requirements are met by code CMI, which encodes bits 0 with 01 and bits 1 with 00 and 11, alternatively. Using this code, each "command" can consist of an 8 bit word, where each of the first two bits and the last two bits is transmitted with pair 10 (which configuration is a code violation), while the other four bits indicate the command type and are transmitted with the code configurations. Inactivity periods are signalled by the presence of the only clock information. The network being active, the modulated carrier is always present and all frame signals are explicity transmitted. Consequently, the devices for protocol management no longer require the bus monitor, whose functions are carried ont by block RR, as explained later. The other devices for protocol management substantially correspond to the whole of blocks ACH, PH, AIH of FIG. 3 of the said patent application. Furthermore, for reconfiguration reasons, all nodes can generate the frame signals, even if in a given configuration, a well-defined node generates them: then, block GA of all nodes comprises a frame signal generator as that described in said patent application.

Coming back to the nodes, in the regular operation of the network, one of the active nodes, N1 in the drawing, acts as bus-head and folding point. The bus-head node is the node whose stations are the first to accede the bus according to the protocol and is the node where the writing branch 1W begins and the reading branch 1R ends; this node is to generate the frame signals. In N1, receiver Rxw and transmitter Txr are connected in order to originate the bus folding; the bus activity is monitored in correspondence of Rxw, while data are transmitted and received in correspondence of Txw and Rxr. The other nodes are transit nodes, and inside them the receiver and transmitter of the same bus branch are connected. Also in these nodes, activity monitoring and transmission take place on the writing branch, while reception takes place on the reading branch.

Besides the active nodes, the network can also comprise passive nodes (Np, Nq in the drawing) where signals are not regenerated. Also these nodes consist of a part RR for connection to the line and a part GA, and present all the same fixed configuration which is not changed by possible network reconfigurations. The node activity is monitored in correspondence of Rxw, the transmission occurs in correspondence of Txw and the reception in correspondence of Rxr. Transmitter Txr is not provided for.

In FIGS. 2 to 5, showing the reconfiguration and the resumption of regular operation conditions, the network consists of eight active nodes indicated for sake of simplicity by the only blocks RR1 . . . RR8. Passive nodes, if any, are not shown.

Figure 2:
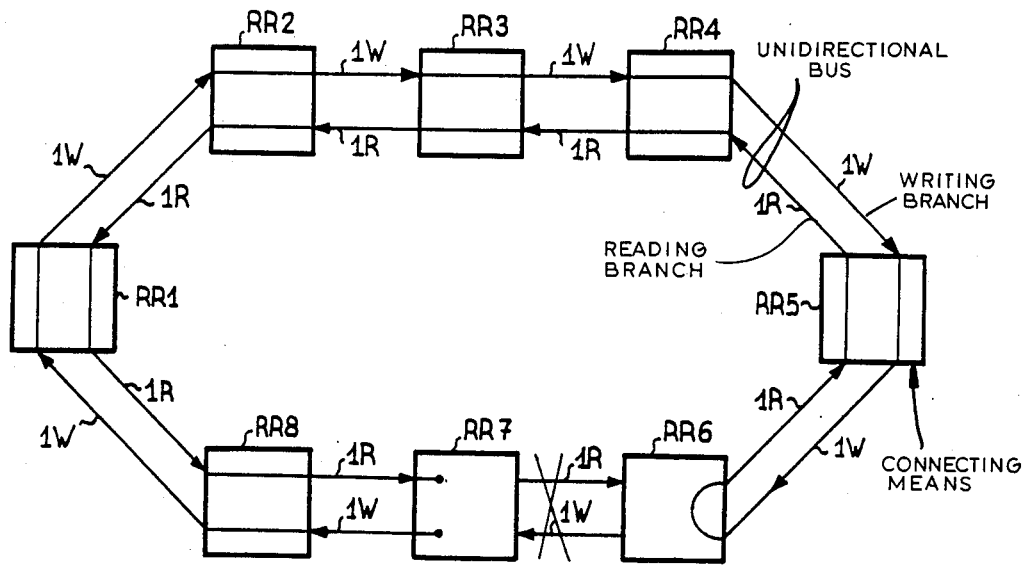
FIG. 2 is a schematic diagram of the network of FIG. 1 after the reconfiguration subsequent to a failure.

FIG. 2 assumes a failure interesting the line between RR6 and RR7: this failure is detected by the two units connected by the line section interested by the failure, in that one of them (RR7) receives no longer signals on branch 1W and the other (RR6) receives no signal on branch 1R; in fact, even if the failure concerns only one branch, failure detection disables the transmitter associated with the other branch.

Because of reconfiguration, node RR7 becomes the bus-head node and generates the frame signals, node RR6 becomes the following-point node; node RR1, which before carried out the double function of bus-head and folding point node, becomes a transit node; the other nodes remain transit nodes. Notwithstanding the failure, the network continues to serve all nodes; only the stations with passive coupling to the bus between RR6 and RR7 are possibly excluded by the service. The reconfiguration implies the bus access reorganization, as the access right is given first to the stations of the new bus-head node while the stations of the folding-point node are the last to accede. The access redistribution is ruled by the bus-head node, as explained later.

Figure 3:
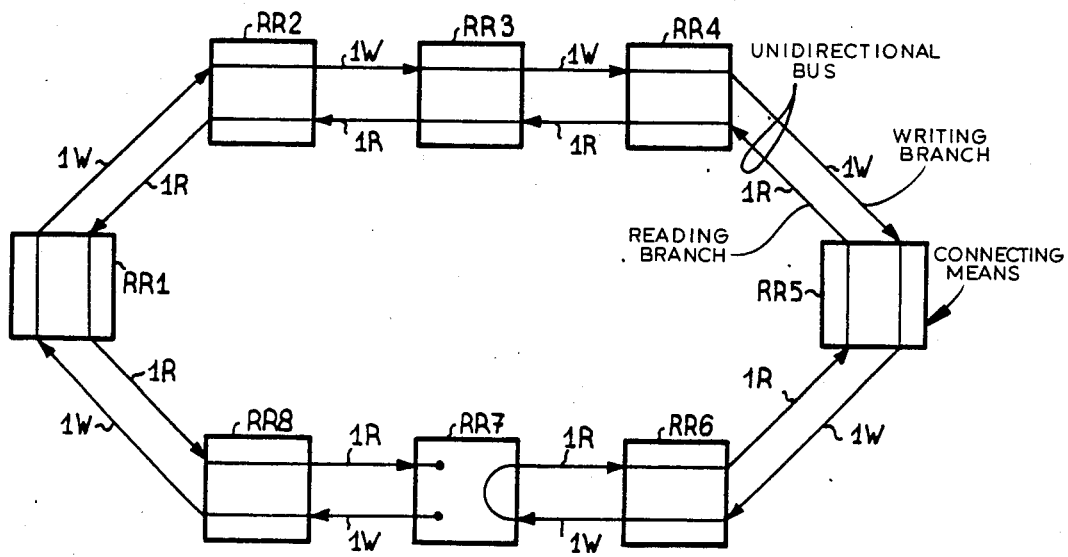
FIG. 3 is a schematic diagram of the network after regular service resumption.

After the repair, the network configuration becomes that of FIG. 3 : RR7 is now bus-head and folding point node and RR6 is again a transit node: in other words, the resumption of the full service does not bring the network to the configuration present before the failure, but the functions of bus-head and folding-point node are carried out by bus-head node of the reconfigured network. Thus, a new reorganization of the access sequence is no longer necessary, after regular service resumption.

In order to reach this configuration, the folding point node RR6 checks the electro-optical continuity of the isolated network section by sending test signals via the writing branch towards that section; in the bus-head node RR7, the signals are transferred to the reading branch and, after they have come back to RR6, the connections are actually changed in RR6 and RR7.

These operations are automatic, but obviously an operator shall inform the controller of RR6 that probably the failure was repaired.

Figure 4:
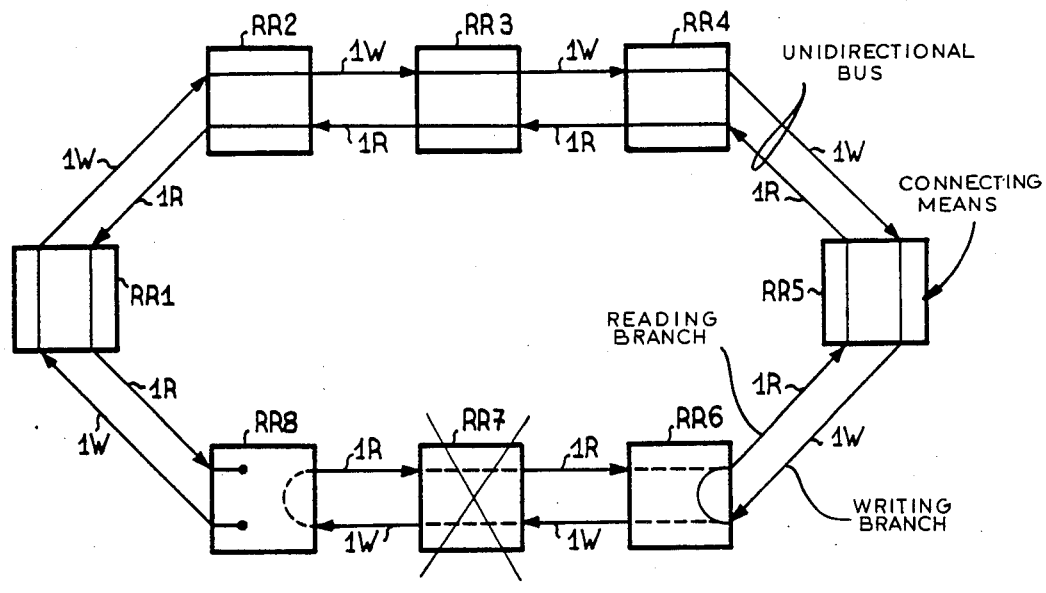
FIGS. 4 and 5 are schematic diagrams of the network under other failure conditions.

FIG. 4 refers to the case of a node failure (e.g. in RR7) or a failure interesting the two line sections adjacent the node: the bus-head and folding point functions are reallotted as already described, and are taken by nodes RR8 and RR6, respectively. Node RR7 and the possible passive nodes connected to the two line sections adjacent to RR7 are excluded from the service. The modalities for service resumption after failure repair have already been described, but, at the test signal reception, node RR7 takes a transit configuration. After the check of the regular operation of the isolated sections, node RR8 becomes bus-head and folding point node. Furthermore, in this case, for a correct new access to the bus by the stations of RR7, RR8 should inform RR7 of the new network configuration due to regular service resumption.

The same procedure is adopted for a failure which isolates more consecutive nodes.

Figure 5:
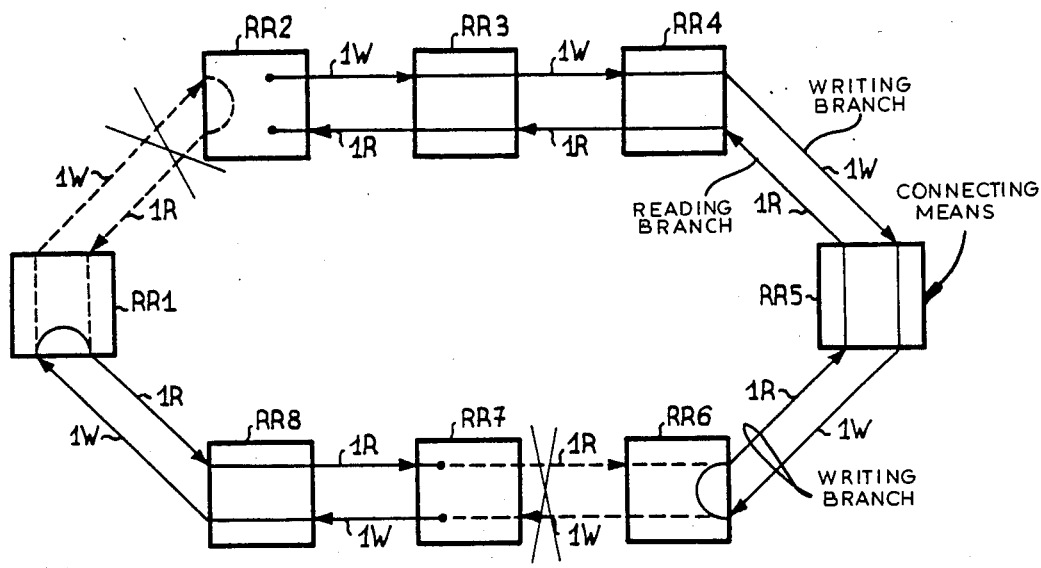

In the case of a failure interesting two distant line sections (i.e. sections not adjacent to a same node), as shown in FIG. 5, the network can become divided into two sub-networks, each presenting bus-head (RR2 and RR7, respectively) and folding point nodes (RR6, RR1). Under these conditions, if unit NCC (FIG. 1) is unique, the sub-network associated therewith can indefinitely survive; the other sub-network can only keep active the ongoing conversations amongst the stations of the relative nodes until their end, and then it is disabled, as new communications even within the same sub-network cannot be set up.

If both sub-networks are associated with a unit NCC, both can indefinitely survive. It is to be appreciated that duplication or multiplication of units NCC does not present the problems connected with the duplication of a ring network controller, as units NCC store management or configuration data and do not intervene for the network access: therefore, the possible data updating has not to be done in real time and, above all, competence conflicts do not arise once fixed the intervention criterium of the different NCC's.

In this case, the full service is resumed step-by-step, by repairing one failure at a time. It is necessary to establish which bus-head node (assuming that both sub-networks are still active) has to become also a folding-point node; e.g., in the case of only one unit NCC, the bus-head node of the sub-network associated with unit NCC can become the bus-head and folding point node; if both sub-networks present a unit NCC, the order of connection recovery depends in general on repair times.

Assuming for example that section RR7-RR6 is first repaired, the joint functions of head-bus and folding point node are carried out, at complete repair, by node RR2. To this end sub-network RR7-RR8-RR1 is put out of service (if not already out of service) by letting the ongoing communications to end and setting up no new communication (if the sub-network presents unit NCC), after the communication of failure repair. Nodes RR1 and RR8 remain folding-point and transit nodes, respectively, while RR7 becomes transit node. RR6 begins the automatic procedure of connection reestablishment already described and takes a transit configuration when the connection has been again set up in the two directions up to RR1. Then, RR2 reorganizes the access sequence, so that RR7, RR8, RR1 begin again the activity and than section RR1-RR2 is put again in service, as already described.

Figure 6:
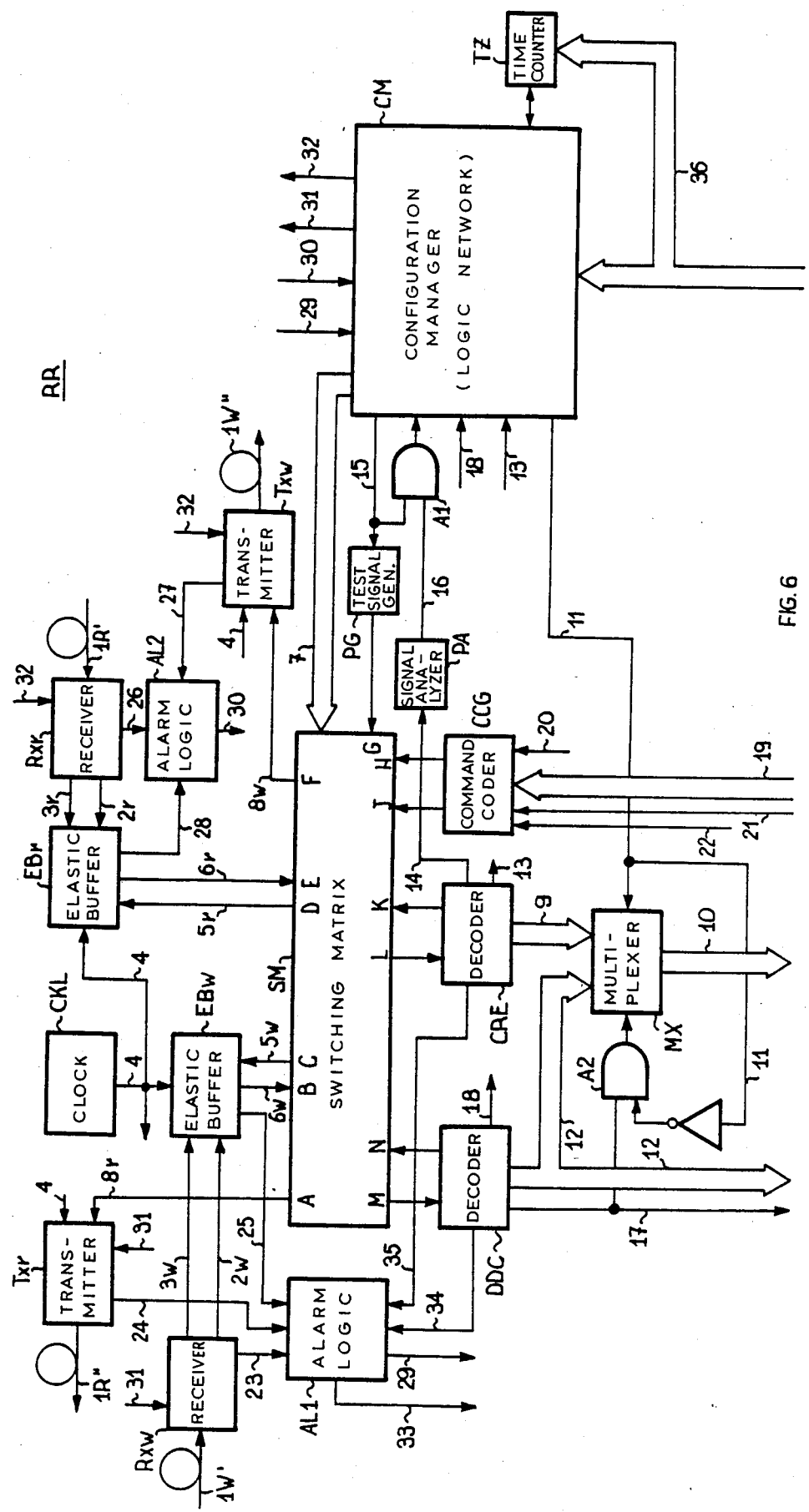
FIG. 6 is a block diagram of the network access devices in an active node.

FIG. 6 shows the structure of a generic block RR of an active node in the case of a plesiochronous network. The plesiochronous solution has been chosen as it makes synchronous the circuit-switched communications while eliminating the problems typical of synchronous networks, where all nodes use the clock signals generated by the bushead node and extracted from the line signals.

In fact, in such networks, the waveform of the clock signals undergoes, in each node, a jitter which increases as the number of network nodes increases. Even if clock signals are regenerated at each node, after a certain number of nodes (i.e. after a certain distance from the bus-head node) the resulting waveform is quite irregular and, taking into account the line transmission rates, does not allow recovery of the timing signals necessary for the devices of node higher levels (up to subscriber equipment).

Using a plesiochronous network, each node presents a local clock generator and then jitter problem does not exist; nevertheless, possible shifts between clock signals of contiguous nodes must be recovered. According to the present invention, this is possible because the bus-head node periodically inserts in the frame a preestablished number of stuffing bits, delimited by a start-of-stuffing and an end-of-stuffing word with the same structure of the "commands"; in each node, by changing the number of stuffing bits sent to the subsequent node and phasing again accordingly the timing signal (e.g. at a rate equal to $\frac{1}{8}$ the line transmission rate) sent to the higher levels (block GA), the number of bits seen in the time unit by the subscribers in the different nodes is always the same, i.e. the network is seen by the subscribers as a "synchronous" network (obviously except the phase relations which are not maintained).

In the drawing $1W'$, $1W''$, $1R'$, $1R''$ denote the reception and transmission section of branches $1W$ and $1R$. Txw, Txr, Rxw, Rxr are the transmitters and receivers already mentioned, which receive enabling and/or disabling signals via wires 31, 32, from a logic network CM (configuration manager).

CKL indicates a local generator of clock signals at the transmission rate on line 1, which are emitted via wire 4 and are used to obtain all timing signals necessary for node devices. For sake of simplicity, these signals are not shown in the drawing. Receivers and transmitters carry out the optical-electrical conversion and viceversa and, furthermore, receivers extract the clock signals from the bit flow received. Via wires $2w$, $3w$ and $2r$, $3r$, clock and information signals are sent to devices EBw, EBr recovering the synchronism in reception (elastic buffers). These buffers are shift registers with an odd number of cells where data are stored upon command of the clock signal extracted from the received bit flow and are read upon command of the local clock signal: in particular, in the absence of drifts between the two clock signals, the bit of the central register cell is read, while in the presence of drifts, the contents of either a cell preceding the central cell, if the local clock signal is faster than the signal extracted from the data flow, or a subsequent cell in the opposite case, are read.

Devices EBw, EBr receive also via wires $5w$, $5r$ a signal indicating the presence on the line of stuffing bits, which signal, becoming active, causes the central register cell to be addressed for reading and commands the reading of the bit of that cell for the whole period when it is active, whatever cell was enabled to the reading when such signal had become active. Furthermore, this signal performs in CKL the rephasing of the timing signal sent to block GA (FIG. 1). Thus, possible drifts are compensated and higher levels have always the same bit number per time unit. A suitable choice of the periodicity of stuffing bit transmission allows compensation to take place before the drift causes problems for the other node devices. The periodic sending of stuffing bits allows buffers of reduced capacity to be used, as a suitable generator choice allows the possible phase shift between the two clock signals to be kept limited. Such devices for synchronism recovery are known and are substantially similar to jitter elimination devices.

Outputs 6w, 6r of EBw, EBr are connected to two inputs (B, E) of a switching matrix SM which, upon commands sent by CM via a bus 7, sets up the connections between inputs and outputs required by the node configuration (bus-head and folding-point, bus-head, folding-point, transit node). Logic network CM is described through flow charts of its operations.

SM receives also at an input I the switching command necessary, when the node is not the bus-head node, to interrupt the transmission when the start-of-frame signal is detected. At the line side, SM presents two outputs A, F connected to Txr and Txw (wires 8r, 8w respectively); at the side of the devices of GA (FIG. 1), SM presents an input H receiving from a command coder and generator CCG the data and commands (this word means the signals necessary for protocol handling and the signals of start and end of stuffing) to be transmitted, and two outputs L, M connected to two decoders CRE, DDC, of which the first monitors the line activity (or the restoration after the failure) and the second monitors and decodes the signals for the stations of its node. CRE, DDC generate also the signal indicating the stuffing period, sent to EBw, EBr via SM, which then presents two ouputs C, D connected to wires 5w, 5r and two inputs K, N connected to CRE, DOC. A further input G of SM is connected to a test signal generator PG, enabled by CM (wire 5), which generator, for a folding point node, sends to Txw the test signals (e.g. identical to the commands foreseen during the regular operation) for controlling the resumption of regular operation conditions.

Figure 7:
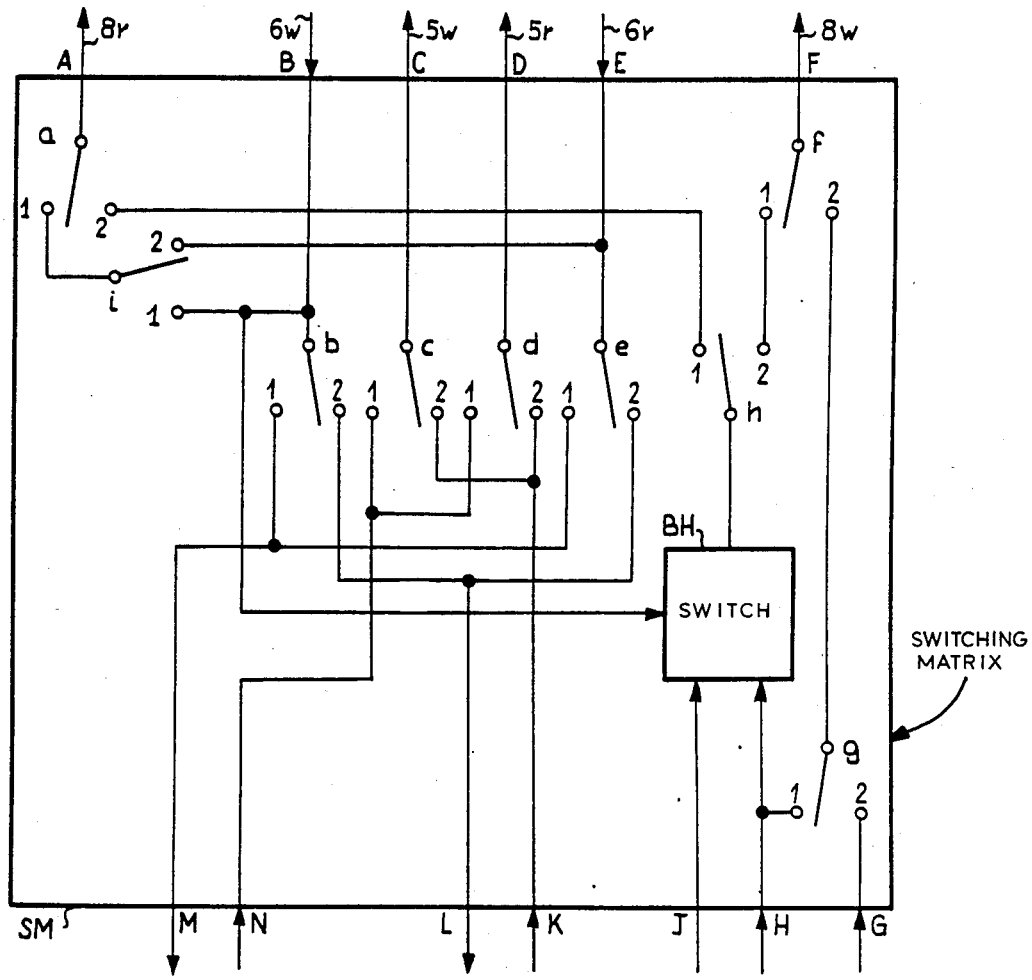
FIG. 7 is a diagram of the switching matrix.

The scheme of the connections set up by SM is shown in FIG. 7 and table 1. References a, b, c, d, e, f, g, h, i indicate a group of switches with two positions 1 and 2. Switches a . . . g are associated with inputs/outputs A . . . G. For sake of simplicity, the drawing does not show the devices decoding the commands supplied by CM and actuating consequently the individual switches.

TABLE 1

|  |  | a | b | c | d | e | f | g | h | i |
|---|---|---|---|---|---|---|---|---|---|---|
| Regular operation configuration | HB/FP | 1 | 2 | 2 | 1 | 1 | 1 | 2 | 2 | 2 |
|  | TR | 1 | 2 | 2 | 1 | 1 | 2 | 1 | X | 1 |
| Reconfiguration after failure | HB | 1 | 2 | 2 | 1 | 1 | 2 | 1 | X | 1 |
|  | FP | 2 | 1 | 1 | 2 | 2 | 2 | 2 | 1 | X |
|  | TR | 1 | 2 | 2 | 1 | 1 | 1 | 2 | 2 |  |

Symbol "X" indicates a "don't care" switch position for the particular node condition. As shown, transit node (TR) connections remain unchanged when passing from the regular operation conditions of the network to the reconfigured conditions because of a failure; also the bus-head node (HB) of the reconfigured network presents the same connections as the bus-head and folding-point node (HB/FP) of the network in its regular configuration.

Circuit CRE detects in the signals coming from EBw or EBr the "commands" which, as said, are transmitted as words beginning or ending with a double code violation. During the node operation as transit node or bus-head and folding-point node, CRE receives the signals emitted by EBw and transfers in parallel the commands detected to the devices of GA via bus 9, multiplexer MX and bus 10. Multiplexer MX transfers to bus 10 the signals outgoing from CRE in the absence of a signal emitted by CM via wire 11 to indicate that the node is a bus-head or folding point node; in the presence of that signal, MX connects bus 10 with a bus 12 outgoing from DDC. Besides transferring the commands to an higher level, CRE generates:

a signal indicating the frame activity in the monitoring point; this signal is sent via wire 13 to CM and consists of a square wave with period equal to a frame duration and in which the pulse and the pause have a duration equal to that of the two frame regions, respectively;

a signal indicating the presence in the frame of the stuffing bits.

For the node acting only as folding point node, decoder CRE receives the signals emitted by EBr: yet, these are not the actual frame signals, but the signals emitted by generator PG; because of the position of MX, the signals received are not sent to higher levels, but only to a test signal analyzer or comparator PA, via wire 14. PA compares the signals received with those generated by PG (stored at its interior) and sends the result of the comparison to CM, via wire 16 and gate A1, enabled by the signal present on wire 15.

Finally, for the bus-head node, CRE is still connected to EBw, and it detects the frame activity which arrives during line restoration operations, and emits the related signal on wire 14; also in this case, MX does not allow signal transfer from bus 9 to bus 10.

Decoder DDC decodes the signals (both information signals and commands) for reception by the respective station and transfers the decoded signals in parallel via bus 12 to the devices of GA (FIG. 1). Via wire 17, DDC signals to these devices whether the signal present on bus 12 is an information signal or a command; furthermore, DDC sends to CM via wire 18 a signal indicating the frame activity seen at the reception side; this signal is equal to that emitted by CRE via wire 13.

The signals to be decoded are sent to DDC by EBr in the case of transit node or bus-head or bus-head and folding point node. In the case of folding point node, DDC receives the signals from EBw. For bus-head nodes and folding point nodes, multiplexer MX upon command of the signal on wire 11, connects bus 12 with bus 10; AND gate A2, connected to wire 17, enables MX when the signal received is a "command". In this phase, DDC has also the functions carried out by CRE during regular network operation. Furthermore, both DDC and CRE signal to an alarm handling logic, described hereinafter, the detection of code violations different from those which delimit the command words (wires 34, 35).

Coder CCG codes the information signals and the commands according to the code adopted. The signals to be coded are sent to CCG via bus 19; a wire 20 indicates whether an information signal or a command is dealt with. The coder sends the signals to Txw if the node is a transit or bus-head or bus-head and folding point node, and to Txr in the case of folding point node.

Two other wires 21, 22 send to coder CCG the information that the node is transmitting and that the start-of-frame signal was seen. The two indications are combined into a command sent, via input J of SM, to a further switch BH of SM (FIG. 7) in order to set up the direct connection between receiver and transmitter and to release the connection between the coder and the transmitter. In fact, a node which sees the start-of-frame signal while transmitting, is transmitting in the packet region and then the transmission has to be immediately stopped.

Receivers Rxw, Rxr, transmitters Txw, Txr and synchronism recovery devices EBw, EBr are also connected via wires 23, 24, 25 and 26, 27, 28 to the alarm handling logic (represented for sake of simplicity by two separate blocks AL1, AL2 even if it is a single device) to which they communicate irregular operation conditions, if any. In particular, the receivers inform AL1, AL2 of the signal lack on wires 1W', 1R', which indicates the interruption of the transmission line or a failure of the optical-electrical transducer. Transmitters can generate alarm signals which indicate the non-transmission of optical power or the transmitter degradation. The devices for synchronism recovery signal the non-arrival of the start-of-stuffing word in case of misalignment between local clock signal and the signal extracted from the signals received, or the exhaustion of the buffer capacity.

In correspondence with one of these signals, devices AL1, AL2 send to CM signals Awr, Ard (wires 29, 30), which cause the disabling by CM of the transmitter on the same side, through a signal sent via wires 31, 32. Thus, the upstream node is informed of the impossible reception by the node interested in the failure. The alarms are also signalled to the devices of higher hierarchical level through an alarm line 33, which is either a signal bus where each signal or a combination thereof indicates an event, or a single line used for synchronous or asynchronous transmission at reduced rate. This single line can collect all alarm and diagnosis signallings (error rate, time between errors EFS, ...) with a great decrease in electric connections between block RR and GA.

The Figure shows also a time counter TZ, connected to configuration manager CM, which generates two time signals whose functions are examined in the description of the flow charts of CM. As for CM, the Figure shows only the signals exchanged with other devices of RR. Signals exchanged with block GA will result from the explanations of said operation flow charts: bus 36 indicates the connections with GA in their whole.

As for passive nodes, block RR comprises only the two receivers Rxw, Rxr directly connected to CRE and DDC, and transmitter Txw, connected to CCG, as well as the logic handling the alarms related to transceivers and decoders. Matrix SM and the other devices whose functions depend on reconfiguration are unnecessary, as reconfiguration is impossible in the passive nodes. Part GA of passive nodes can substantially correspond to that of the active nodes, except the frame signal generator which is dispensed with.

Figure 8A:
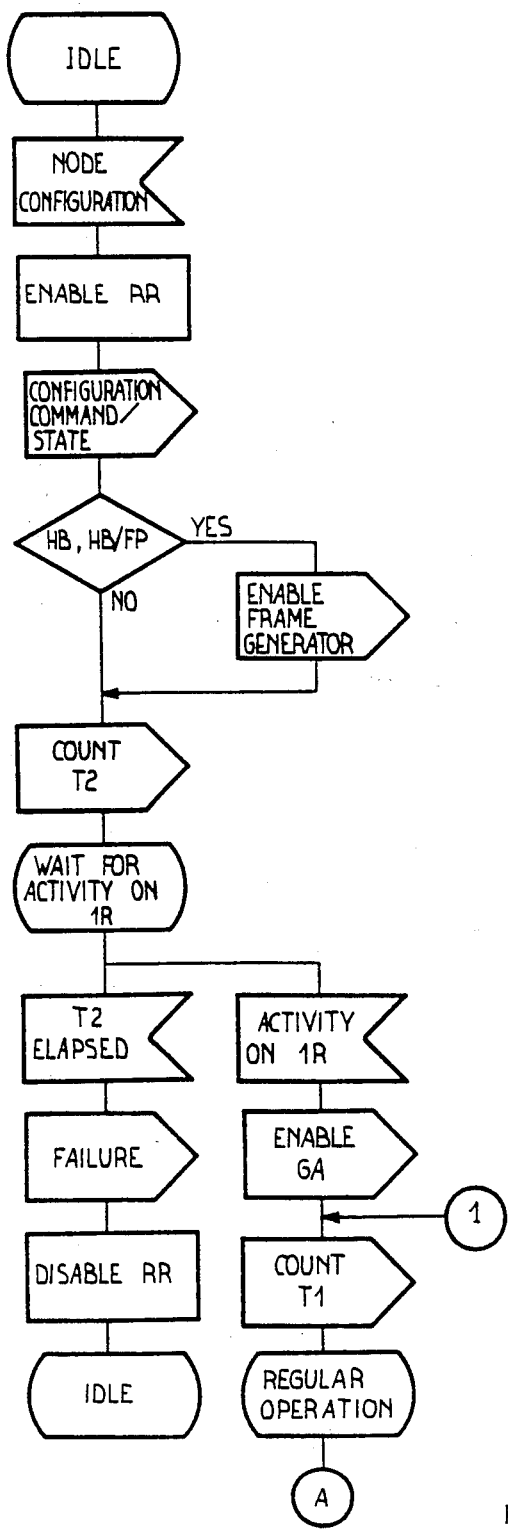
FIGS. 8 to 10 are flow charts of the reconfiguration logic.
Figure 8B:
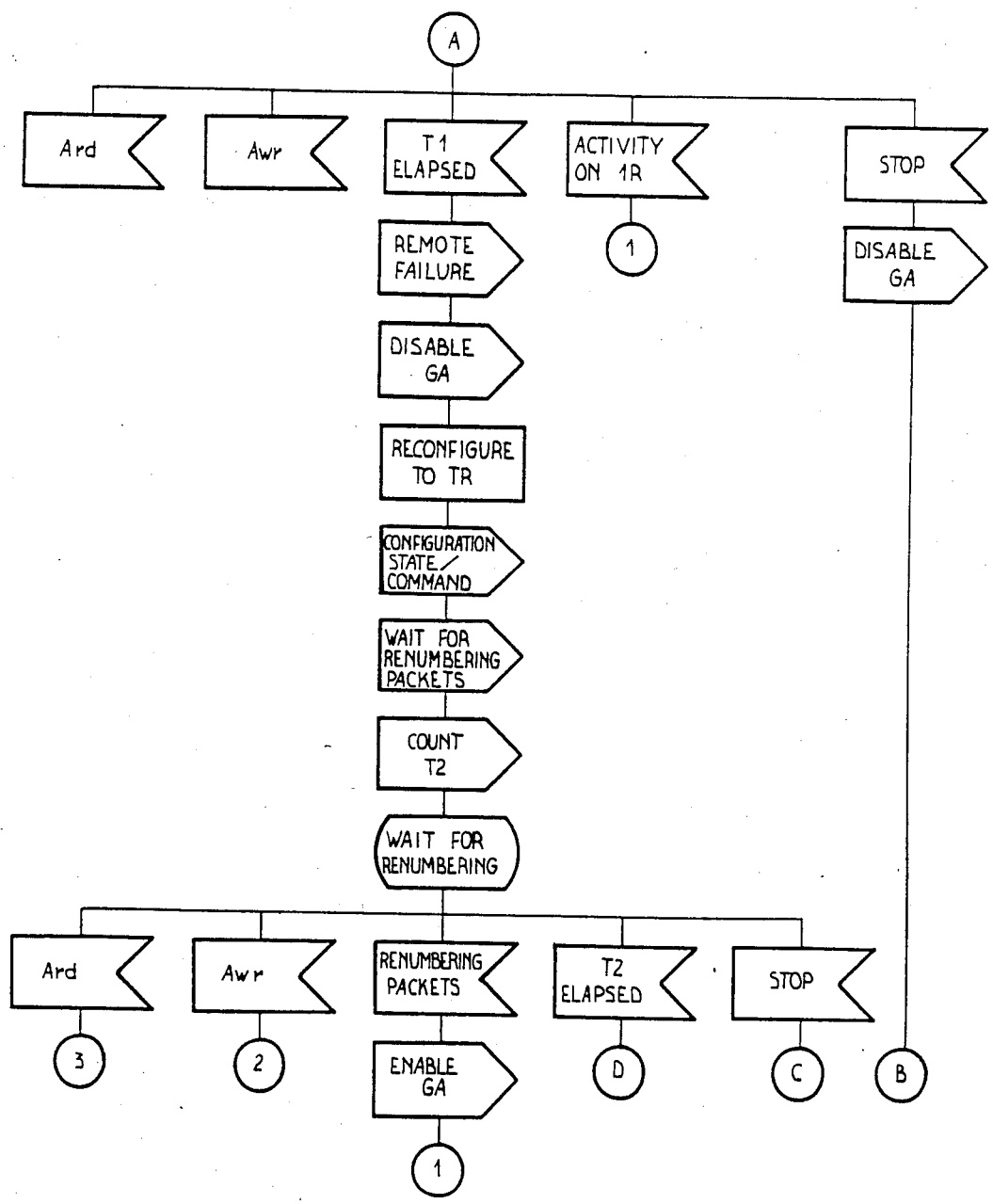

In FIG. 8, block CM (FIG. 6) leaves the initial idle state upon command of the node controller which communicates to CM information related to node type (bus-head, transit, folding point ...), frame duration, etc.. through a suitable message (node configuration).

Once received this message, CM enables the devices of RR (enable RR), duly switches the contacts of matrix SM and informs the node controller of the configuration adopted (configuration command/state); furthermore, if the node is a bus-head or bus-head and folding point node (HB, HB/FP) a request of enabling the frame signal generator (enable frame/generator) is sent to GA (FIG. 1).

Is the network under regular conditions, activity is present on the line reading branch. This activity is signalled by DDC to CM via wire 18, e.g. when DDC detects the start-of-frame signal, and should be detected within a time T2 (e.g. of the order of a few minutes) which is counted by T2 upon enabling by CM (count T2, wait for activity on 1R).

If time T2 elapses before frame activity detection, CM signals a failure to the node controller (failure), disables the devices of RR (disable RR) and recovers the idle state.

Figure 8C:
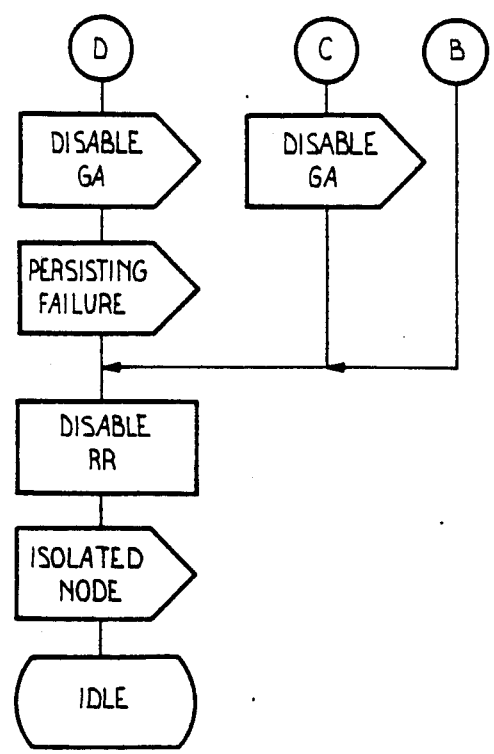

If the signal on wire 18 really arrives before time T2 has elapsed (activity on 1R), CM enables the devices which in GA handle the access and store the information flows (enable GA), and enables in TZ the counting of a time T1 equal to twice the frame duration (count T1): the node is now ready for a regular operation. This state requires the activity continuity at the reception side (i.e. the signal on wire 18 should regularly arrive before time T1 has elapsed); whenever CM sees this signal, it stops the counting of T1 and starts it again while waiting for the next signal. The operations remain unchanged until an anomalous condition is detected (T1 elapses before the arrival of the signal via wire 18 or an alarm signalling Awr, Ard, FIG. 8b, arrives from a device AL1, AL2) or the node activity is stopped by the node manager (STOP). The stop can arrive in any instant and disables RR and GA, this disabling being confirmed to the node manager (isolated node) before resetting to the idle state (FIG. 8c).

Alarms Awr, Ard are due to a failure either in the devices of the upstream (downstream) station, with reference to transmission direction on branch 1W, or in the bus section upstream (downstream) the node, i.e. in the fibre or the transmitter of the upstream (downstream) node. The alarm handling is described with reference to FIGS. 9, 10.

Conversely, the lack of activity for a time longer than two frames (T1 elapsed, FIG. 8b) indicates a remote failure, i.e. a failure interesting neither the node CM belongs to, nor adjacent nodes or line sections. Under these conditions, CM informs the node controller of the remote failure, disables the devices of GA, puts matrix SM in the transit node configuration (reconfigure to TR), confirming the new configuration (configuration command/state) to the controller and re-enables in GA only the devices managing the renumbering packets (wait for renumbering packet), through which the bus-head node informs the other nodes of the new order of access to the line due to network reconfiguration. Then, CM begins counting time T2 and reaches a state of wait for renumbering. If the packet(s) arrive(s), CM enables again GA as in initialization phase and resumes the regular operation, as described.

The elapsing of time T2 means that the node is isolated: CM blocks again GA, informs the node controller of a persisting failure and then the operation continues as in the "stop" case.

During the wait for the renumbering packets, also the alarms can arrive; they are handled as those arriving during the regular operation.

Figure 9A:
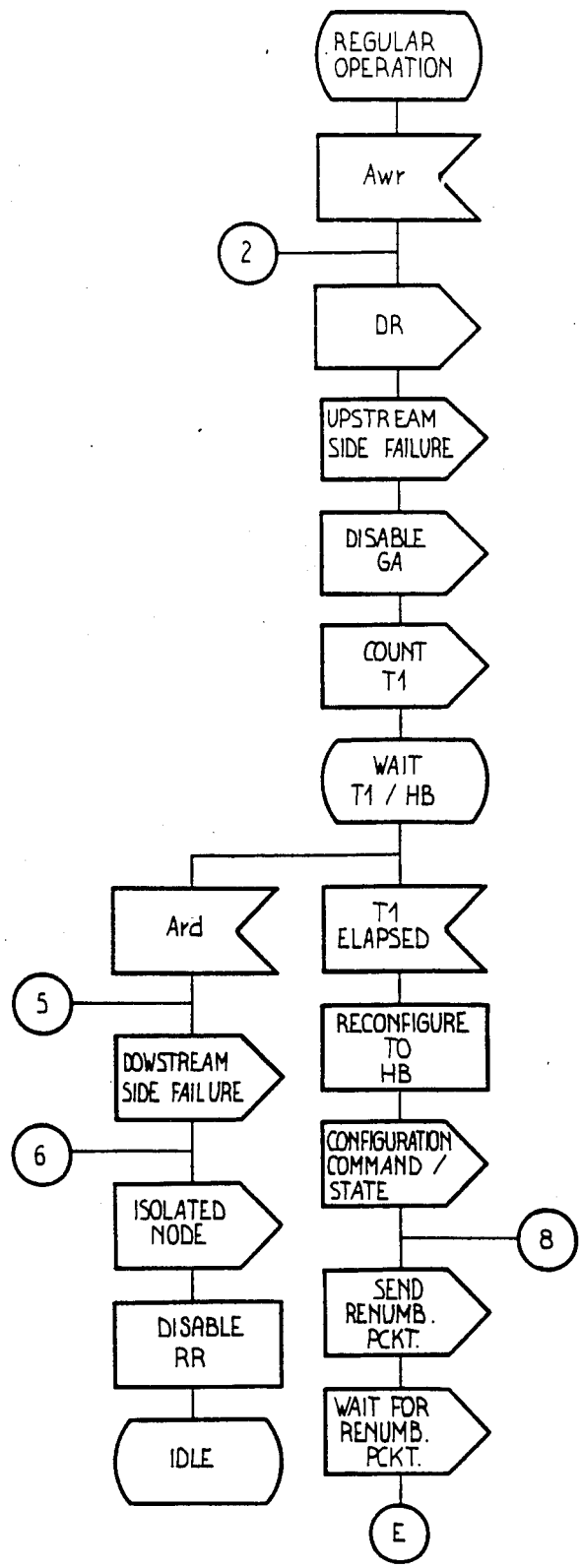
Figure 9B:
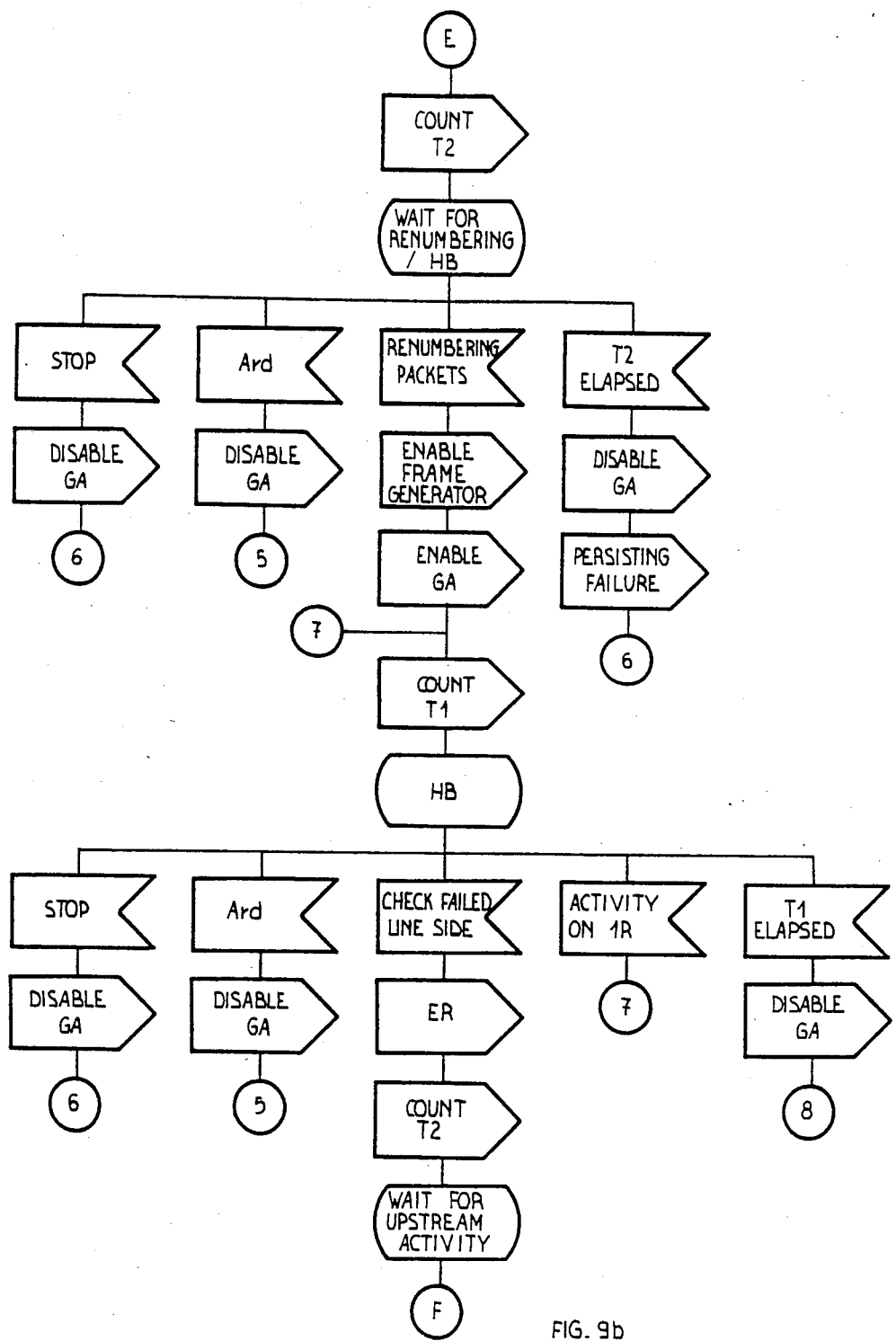
Figure 9C:
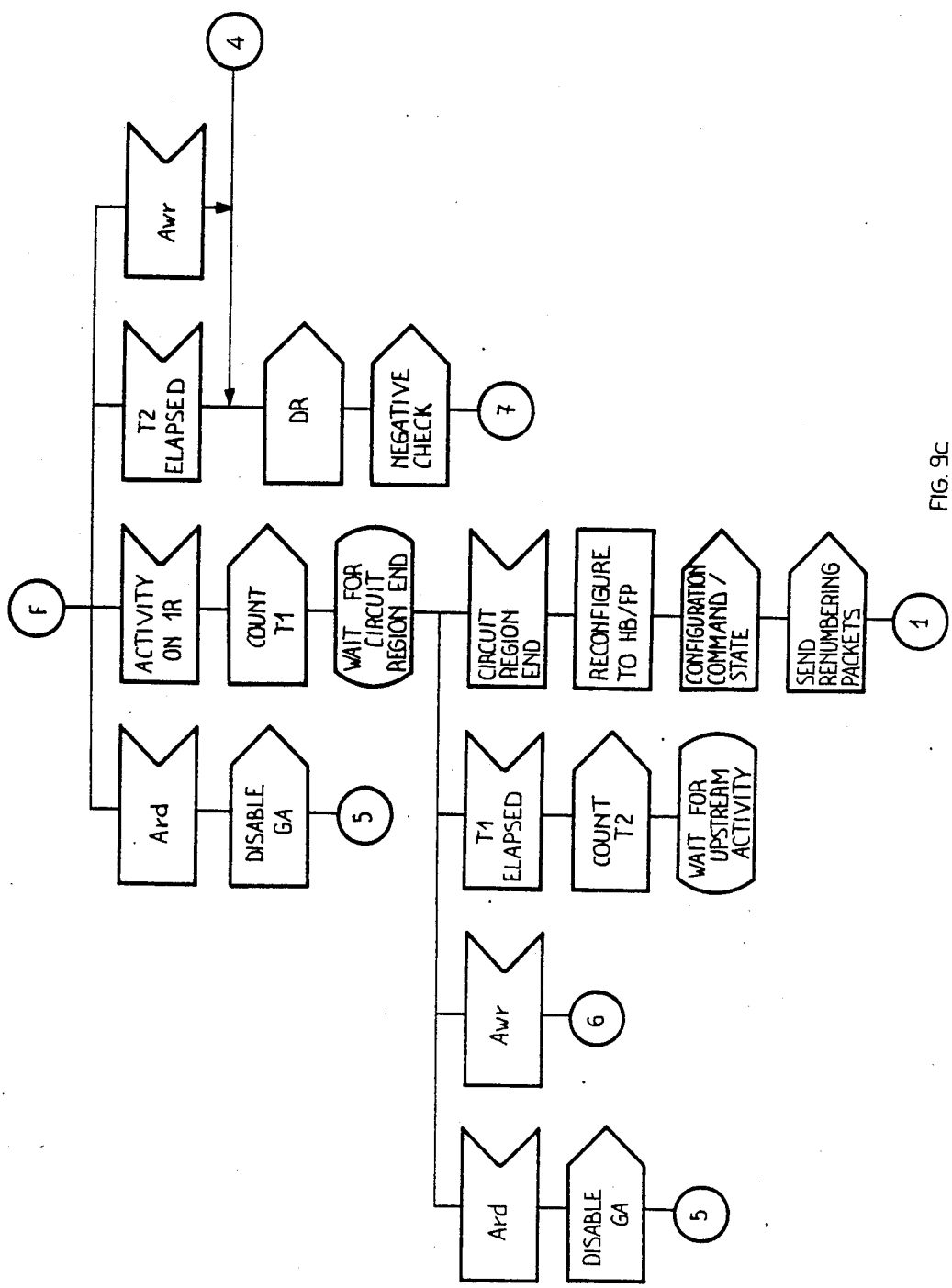

FIG. 9 shows the operations carried out by CM in the case that an alarm Awr arrives from AL1, i.e. an alarm indicating a failure or a degradation of Rxw, Txr or an interruption of line branch 1W'; this is the situation of node RR7 in FIG. 2, i.e. of the node becoming bus-head node. CM (FIG. 6) disables through signal DR on wire 31 the upstream-side devices, informs the node controller of the failure (upstream-side failure), disables GA and begins counting time T1, reaching a state of wait for the elapsing of T1 and subsequent reconfiguration to bus-head node (wait T1/HB).

The communication to node controller allows it to carry out all operations interesting the highest hierarchical levels of the protocol and not presenting special time requirements (e.g. sending of information to NCC, FIG. 1).

The waiting for the two frame periods ensures that remote nodes take notice of the failure and act as described in FIG. 8.

When T1 has elapsed, the node must be reconfigured as bus head node (reconfiguration to HB). After matrix switching and reconfiguration acknowledgement to the node controller (configuration command/state), CM asks GA (FIG. 1) the broadcasting of the renumbering packets and the wait for the return, which has to take place within time T2. Therefore, CM reaches a state of wait for renumbering as bus head station (wait for renumbering/HB, FIG. 9b).

If time T2 elapses before renumbering packet has been seen, the same modalities as in the similar case of FIG. 8 are adopted. Conversely, if the renumbering packet arrives within the time established, CM commands resumption of the full activity to GA (enable GA) and begins the counting of time T1 in order to see the frame activity continuity, as in the case of initial enabling. The node reaches a reconfigured state as bus-head node (HB).

The lack of frame activity for a time T1 indicates that, meanwhile, a second failure happened (remote failure). This is the situation of FIG. 5 where the network is divided into two subnetworks.

In this case, after the disabling of GA, the operations are resumed from the order of sending the renumbering packet for the network which the node examined pertains to (connector 8).

Conversely, if the frame activity is continuous, the node remains in the reconfigured state until the node controller is informed that the network is available for full service resumption. As a consequence, the node controller tries the re-insertion of the area previously excluded (check failed line side). To this end CM reenables receiver Rxw and transmitter Txr (ER) through the signal on wire 31 and waits for the activity on that side (count T2, wait for upstream activity).

If time T2 elapses before activity is seen, the restoration of the full service cannot take place: CM disables again Rxw, Txr (DR), informs the manager that the check was not successful (negative check) and returns to operate as bus-head node (connector 7).

Conversely, if the upstream activity is regular, CM must connect DDC to Rxw and disconnect it from Rxr, as the bus head node becomes bus-head and folding point node.

This switching has not to affect the node activity, therefore it can take place after the end of the circuit region: in fact, at the end of the circuit region, the first operation to be carried out is the sending of signal RB, which is sent by the bus-head node.

The end of the circuit region must be detected within time T1. If T1 elapses before the detection, CM begins the counting of T2 and reaches again the state of wait for the activity from the isolated side. Conversely, if the end of the circuit region is seen within time T1, the node can take bus-head and folding point configuration (HB/FP) and, after switching in matrix SM and requesting GA to send the renumbering packet for the nodes previously isolated, returns to the operations foreseen for the regular service (connector 1, FIG. 8).

During the operations of regular service resumption or during the wait for the circuit region end, alarm Awr can again arrive. In this case, Txr and Rxw are again disabled as for the first alarm signalling, the node controller is informed that the check of of the failed line has given a negative result and the state "HB" (connector 7) is resumed beginning the counting of time T1 while waiting for the order of a new check.

During these phases as well as during the wait for the reconfiguration as bus-heas node (wait T1/HB) and for the renumbering packets, failure alarm Ard related to the other line side (Txw, Rxr, FIG. 6) can arrive. In this case, after a possible disabling of GA, CM signals the failure to the node controller (downstream side failure) and then the procedure continues as in the STOP case of FIG. 8. Obviously, the STOP can also arrive during the phases of wait for the renumbering packets and during the "reconfigure to HB" state.

Figure 10A:
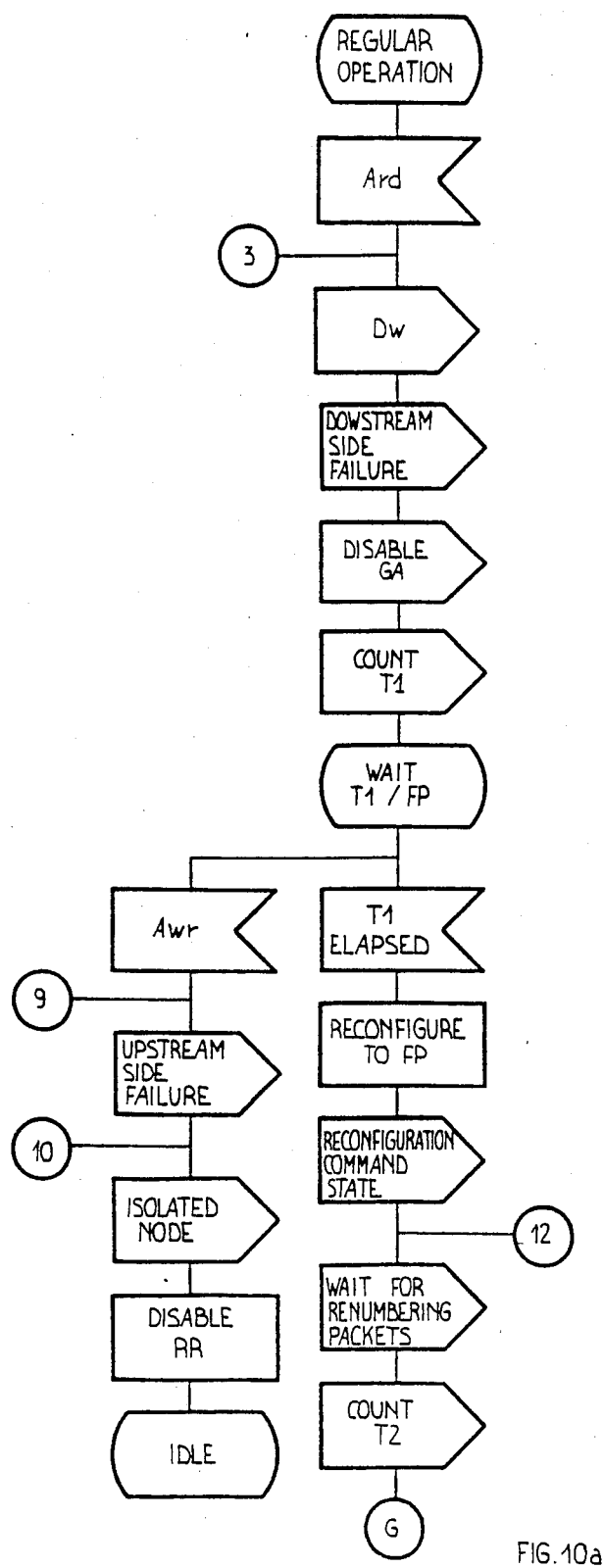
Figure 10B:
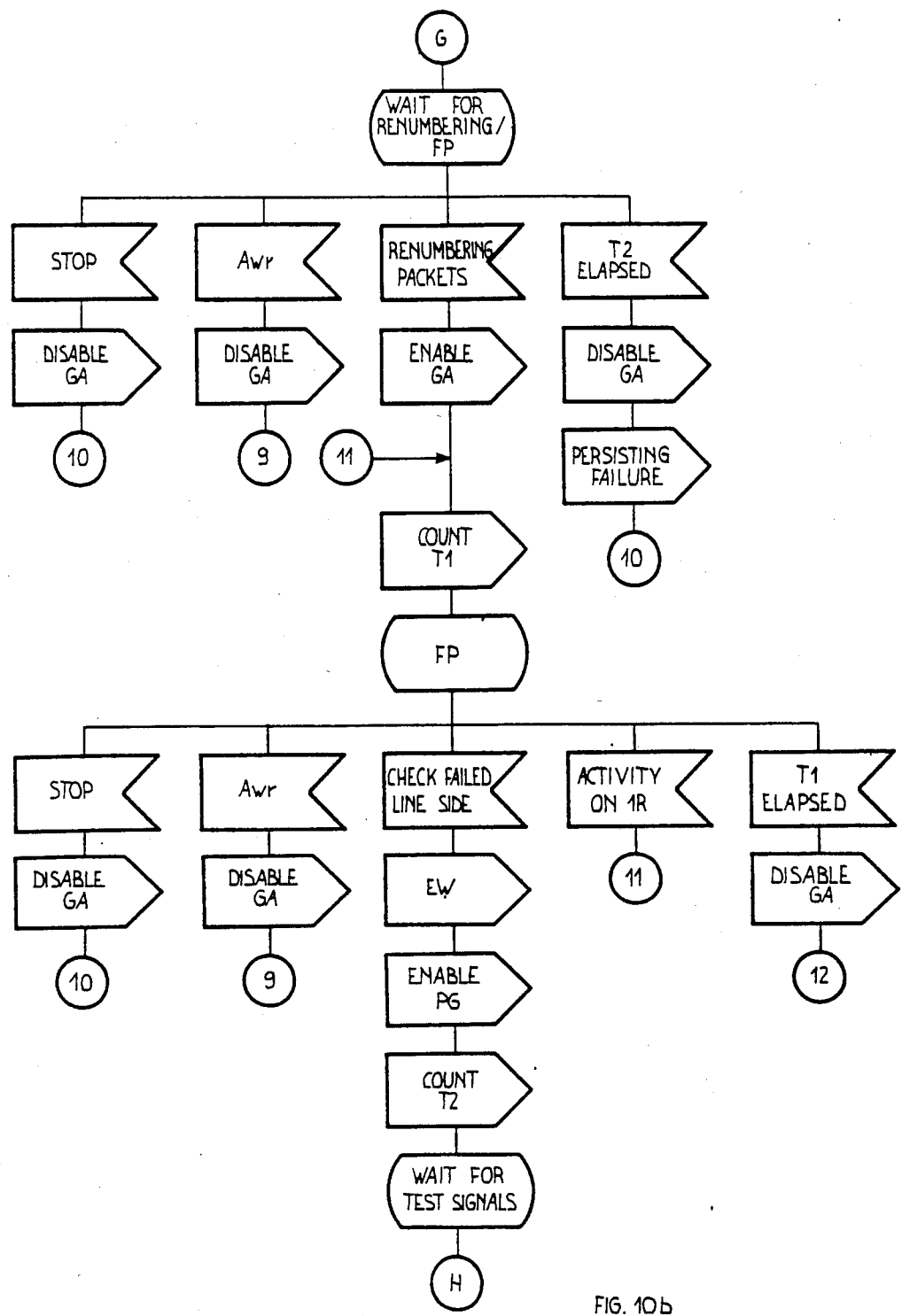
Figure 10C:
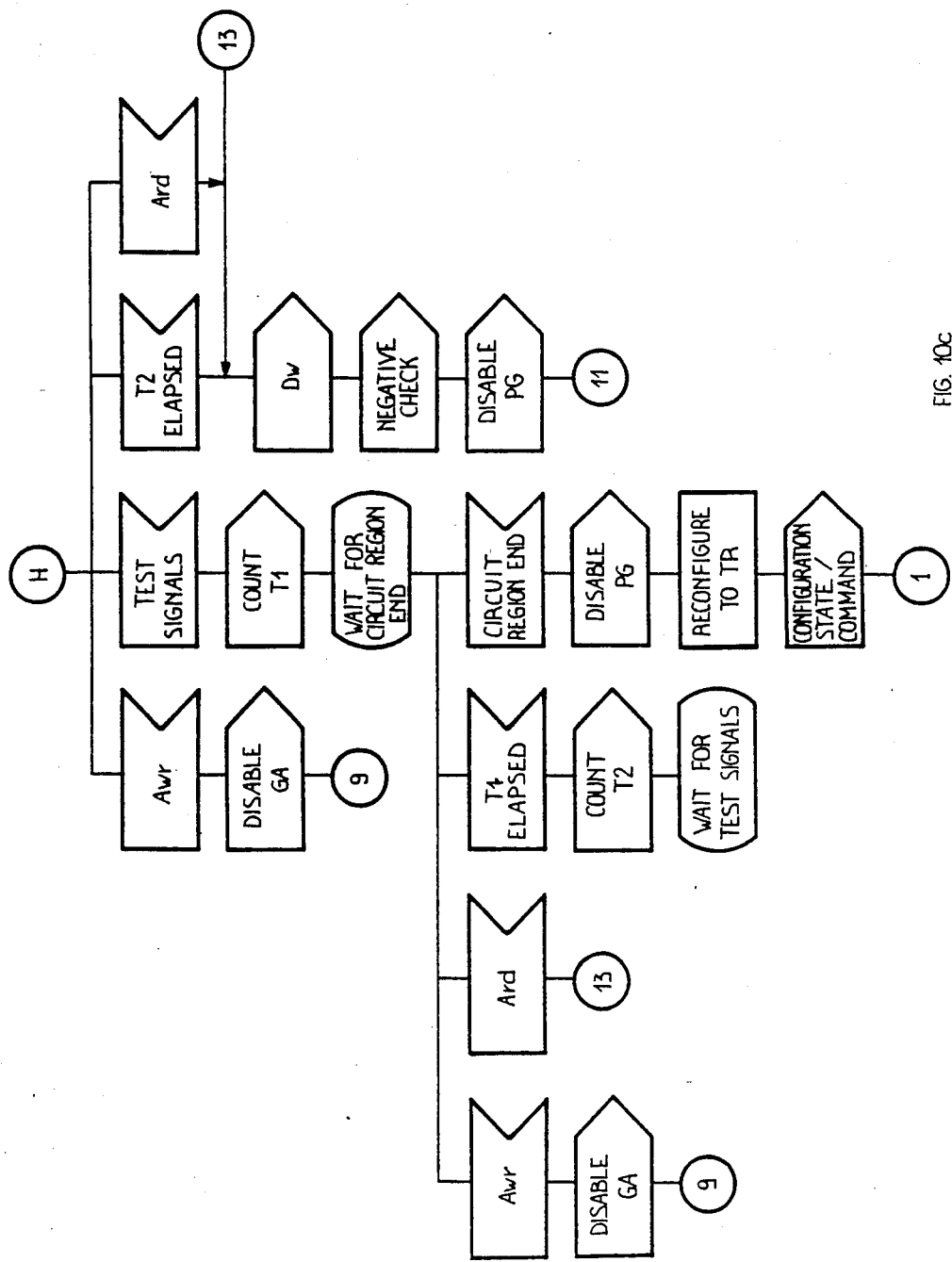

FIG. 10 shows the operations carried out in the case of alarm Ard emitted by AL2 (FIG. 6), i.e. an alarm indicating a failure or a degradation of Rxr, Txw or an interruption of branch 1R' of the line: e.g. this is the situation of node RR6 in FIG. 2, i.e. of the node which must become a folding point node.

All operations carried out up to the check on the failed line side are almost similar to those of FIG. 8, with the only exchange between "downstream side" and "upstream side"; the reconfiguration sets up in SM the connections required by a folding point node.

As a consequence of the order of check on the failed line side, CM re-enables the transceivers (EW), enables test signal generator PG, through the signal on wire 15, to send the signals to the side where the failure occurred (enable PG) and begins the counting of time T2 in order to wait for the return of test signals and the result of the comparison carried out by PA.

If test signals are received within time T2 and are equal to the signals transmitted, the node must be set to become a transit node. The configuration change, in this case also, will take place at the end of the circuit region, after disabling PG, so as not to affect the regular operation in the current frame. In fact, the node reconfiguration from states FP or TR implies a physical lengthening of the bus and then an increase of the propagation delay; if switching from FP to TR is carried out in the circuit region, in the inactivity interval between two generic upstream nodes, e.g. Ni and N(i+1), on the reception channel the activities of Ni and N(i+1) will be separated by an inactivity interval equal to the propagation delay in the bus section put again in service; this will cause errors in the reception of the circuit switched information concerning all nodes after N(i+1). In any case, transition FB to TR requires execution times which are likely to exceed the inactivity interval which divides the activities of two consecutive nodes; this will make impossible to reconfigure the node during the circuit and packet regions of the frame without destroying the existing activity. Conversely, if this additional delay is inserted in the interval between the frame circuit and packet regions, no disadvantages are present.

After the passage to transit node, CM returns to the regular operation state (connector 1, to FIG. 8).

The cases of anomalies during the procedure of reconfiguration or full service resumption are similar to those of the previous case, once mutually exchanged the "upstream" and "downstream" indications: let us underline that if the end of the circuit region is not seen, the state of wait for the test signals is resumed, while the negative result of the comparison carried out by PA causes the disabling of generator PG before the return to the reconfigured state (connector 11).

We claim:

1. Reconfigurable high-speed integrated local network comprising:
   a unidirectional optical fiber line;
   a plurality of stations, each of said plurality of stations forming a node, said node being selected from the group of bus-head node, folding-point node, bus-head-folding-point node, transit node, and passive node, said plurality of stations being connected by said line, said plurality of stations exchange through said line information coded and organized in hybrid frames having a first region assigned to circuit switched communications and a second region assigned to packet switched communications, whereby said line being bus folded, at said folding-point node, as to form a writing branch and a reading branch, said writing branch and said reading branch being active at the same time, wherein said writing branch begins and said reading branch ends at said bus-head node, if said folding-point node and said bus-head node are identical herein referred to as said bus-head-folding-point node, wherein at said transit node said line information being received via said writing branch is sent to a next node via said writing branch and said line information being received via said reading branch being sent to said next node via said reading branch, and wherein at said passive node there being no regeneration of said information, each of said plurality of stations comprising:
   a connecting means for connecting and reconfiguring each of said plurality of stations to said line, wherein during regular network operations said bus-head node and said folding-point node are identical forming said bus-head-folding point node, whereby during a failure in said network, said connecting means isolates said failure in said network referred to as a failed component, wherein said connecting means reconfigures said bus-head-folding-point node to form said transit node and first adjacent station of said plurality of stations forming said folding-point node and second adjacent station of said plurality of stations forming said bus-head node, said connecting means for each of said plurality of stations being controlled locally at each of said plurality of stations, and
   a line access means for line access handling an ordered access protocol for each of said plurality of stations in said first region and said second region, said protocol being based on physical position of said node and being such that each of said plurality of stations access said unidirectional optical fiber line, said line access means having a frame signal generator, which at least generates a start-of-frame signal, a region-boundary signal, a start-of-packet-round signal, wherein only said frame signal generator of said bus-head node being enabled.

2. A network as defined in claim 1 wherein for a failure of one of said plurality of stations, referred to as a failed station, said connecting means of said bus-head node reconfigures said bus-head node to said transit node, said connecting means of said folding-point node reconfigures said folding-point node to said transit node, upon detection of a lack of activity on said writing branch by said first adjacent station, said connecting means of said first adjacent station reconfigures said first adjacent station forming said bus-head node, upon detection of a lack activity on said reading branch by said second adjacent station, said connecting means of said second adjacent station reconfigures said second adjacent station forming said folding-point node.

3. A network as defined in claim 1 wherein for a failure of a section of said line, referred to as a failed line section, said connecting means of said bus-head node reconfigures said bus-head node to said transit node, said connecting means of said folding-point node reconfigures said folding-point node to said transit node, upon detection of a lack of activity on said writing branch by said first adjacent station, said connecting means of said first adjacent station reconfigures said first adjacent station forming said bus-head node, upon detection of a lack activity on said reading branch by said second adjacent station, said connecting means of said second adjacent station reconfigures said second adjacent station forming said folding-point node.

4. A network as defined in claim 1 wherein for resumption of regular service after repair said connecting means of said folding-point node checks line continuity with said failed component, with test signals, generated by a test signal generator, sent via said writing branch to said bus-head node, upon successful testing said connecting means of said folding-point node reconfigures said folding-point node to said transit node, said connecting means of said failed component reconfigures said failed component to said transit node, and said connecting means of said bus-head node reconfigures said bus-head node to said bus-head node to said bus-head-folding-point-node.

5. A network as defined in claim 2 wherein after reconfiguring said access means of said bus-head node being enabled by said connecting means, said access means sends renumbering information to said plurality of stations informing reconfiguration of said network.

6. A network as defined in claim 1 wherein said connecting means comprise:
   a first receiver and a first transmitter for said writing branch;
   a second receiver and second transmitter for said reading branch, said first receiver, said first transmitter, said second receiver and said second transmitter perform electrical optical conversions and retransmission of said information, said first receivers and said second receiver extract clock signals from said information;
   a local clock generator;
   a first synchronizing means for said reading branch and a second synchronizing means for said writing branch for compensating for phase shifts between clock signals from said information and said local clock generator;
   a signal coder being switchable between said first transmitter and said second transmitter for transmitting a first coded signal if said information is being transmitted and transmitting a second coded signal if said access protocol is being transmitted;

a command detector being switchable between said first receiver and said second receiver for detecting said access protocol;

a decoder being switchable between said first receiver and said second receiver for decoding said access protocol and said information;

a control logic network;

a switching matrix coupled to said first transmitter, said second transmitter, said first receiver, said second receiver, said first synchronizing means, said second synchronizing means, said signal coder, said command detector, said decoder and said control logic network for control said switching matrix, said signal coder, said command detector and said decoder for configuring said connecting means from the group of said bus-head node, said folding-point node, said bus-head-folding-point node, and said transit node.

7. A network as defined in claim 6 wherein said coder codes said access protocol words whereby initial and final bits represent violations of said second coded signal, while intermediate bits encode type of said access protocol.

8. A network as defined in claim 7 wherein said coder of said bus-head node and said bus-head-folding point node inserts among said information signal, with defined periodicity, stuffing bits preceded by a start stuffing signal and followed by an end stuffing signal, said start stuffing signal and said end stuffing signal begin with word representing violation of said access protocol.

9. A network as defined in claim 8 wherein said first synchronizing means and said second synchronizing means consist of elastic buffers, where bits received are sequentially written upon command of said clock signals, extracted by said first receiver and said second receiver, and where said bits being stored in a central position indicates absence of phase shift between said local clock generator and said clock signal, while a position preceding said central position indicates a lagging phase shift between said local clock generator and said clock signal, while a position following said central position indicates a leading phase shift between said local clock generator and said clock signal; and upon detection of said stuffing bits, said central position is read and signal clock signal is then compensated for phase shift.

10. A network as defined in claim 8 wherein said connecting means further comprise an alarm means for detecting malfunctions of said first receiver, said second receiver, said first transmitter and said second transmitter, said alarm means being coupled to said control logic network for signalling said control logic network upon detection of said malfunctions.

11. A network as defined in claim 8 wherein said test signals being in the form as said access protocol and said connecting means further comprising a test signal analyzer coupled to said command detector for comparing said test signal received with said test signal transmitted.

12. A network as defined in claim 8 wherein said switching matrix:

for said transit node, said switching matrix sets up a connection between said second receiver, said second transmitter and said decoder and a connection between said first receiver and said first transmitter while said transit node is not transmitting and between said coder and said first transmitter while said transit node is transmitting;

for said folding-point node said switching matrix sets up a connection between said coder and said second transmitter, between said first receiver and said decoder, between said test signal generator and said first transmitter and between said second receiver and said command detector; and for said bus-head node and said bus-head-folding-point node said switching matrix sets up a connection between said second receiver and said decoder, between said first receiver and command detector and between said first receiver and said second transmitter.

* * * * *